Patented June 25, 1940

2,205,420

UNITED STATES PATENT OFFICE 2,205,420

SAFETY GLASS

Lucas P. Kyrides, Webster Groves, Mo., assignor to Monsanto Chemical Company, St. Louis, Mo., a corporation of Delaware No Drawing. Application June 17, 1937, Serial No. 148,737

23 Claims. (Cl. 49—92)

The present invention relates to polymerized vinyl acetal plastic compositions of matter and particularly to such compositions which in the form of films are eminently suitable for use as intermediate sheets or interlayers of laminated or safety glass.

This application is a continuation-in-part of my co-pending applications, Serial Numbers 119,756 and 119,757, filed on January 7, 1937, which have issued as Patents Nos. 2,120,755 and 2,120,756, respectively, both of which are continuations-in-part of my prior applications, Serial No. 618,305, filed on June 20, 1932, which has issued as Patent No. 2,073,937, and Serial No. 648,986, filed on December 27, 1932, which has issued as Patent No. 2,073,938.

Cellulose esters have for a long time been used as the base of plastic compositions for intermediate sheets in safety glass manufacture. Nitrocellulose until a few years ago dominated the field for this purpose but because of its tendency to discoloration and decomposition on prolonged exposure to light it has lost its position to cellulose acetate. The imperfections of safety glass made from cellulose nitrate and cellulose acetate are recognized and with the gradual development of other materials, the position of pre-eminence held by these cellulose esters is gradually being lost. Particularly because of the tendency of cellulose acetate plastics to become brittle at low temperatures, they are being replaced by materials such as the condensation products of aldehydes with partially hydrolyzed vinyl ester polymers, known commonly and referred to hereinafter as vinyl acetal polymers or vinyl acetal resins, and designated in commerce under trade names such as Formvar, Butvar, Alvar, certain Vinylites, etc.

It might be presumed that the technique which has gradually evolved and developed in the production of cellulose ester plastic sheets for use as interlayers in safety glass and the method of manufacturing safety glass therefrom could be applied without substantial modification to the production of plastic sheets of vinyl acetal resins and the manufacture of safety glass therefrom. However, these vinyl acetal resins present special difficulties of their own, not only in the compounding of plastic sheets from them, but also in incorporating the sheets between glass plates and in finishing the safety glass. For example, safety glass made with cellulose acetate sheets is usually sealed at the edges of the finished sheet, as is well known, but glass made with vinyl acetal resin sheets is not, because the methods which have been developed for sealing cellulose ester compositions are not directly applicable to sealing vinyl acetal resin compositions.

If greatest importance in the production of plastic compositions for use in the manufacture of interlayers for safety glass are the modifying agents, particularly plasticizers, which are intimately incorporated into the basic plastic material. Most of the plasticizing materials which are in common use for modifying cellulose esters have been tried for modifying vinyl acetal resins. The results have been varied but in no case have they been satisfactory in all respects. Not only do the results indicate that the common known plasticizers are unsatisfactory for vinyl acetal resins, but they also indicate that there is not even a definite relationship between effectiveness in cellulose esters and effectiveness in vinyl acetal resins. It has thus become apparent that specific plasticizers for vinyl acetal resins are necessary if any degree of usefulness and effectiveness is to be obtained.

The common aryl phosphates, such as triphenyl phosphate and tricresyl phosphate, give films with vinyl acetal resins but these films are brittle at low temperature. Alkyl phthalates, such as dibutyl phthalate, when used as plasticizing agents for vinyl acetal resin films require the use of inordinately large proportions in the resulting composition and such films are soft. In attempting to achieve flexibility the addition of a large proportion of these plasticizers produces films in which flexibility is sacrificed for hardness or stiffness. Soft films of this character present certain difficulties in handling. Since soft films resist sliding movement over the glass sheets, they have a tendency to trap air between the surfaces of the layers and, because of their tendency to deformation, they are not easily handled in washing. Some success has been attained by cooling such soft sheets before subjecting them to the operations necessary in safety glass manufacture but this and other make-shifts are resorted to only because no plasticizing material having a desirable combination of properties is available.

The properties which are desirable in interlayers for safety glass are well known. Besides the properties of transparency, retentivity, resistance to discoloration by heat and actinic light, resistance and imperviousness to water, toughness, etc., there are other properties which have not been so well emphasized in the past, possibly because of the inability to realize heretofore any degree of improvement in these respects.

These properties are flexibility at low temperatures and relative hardness or stiffness of the film and freedom from tackiness so that it might the more easily be handled.

It is the object of the present invention to provide films characterized by and improved in the above-enumerated properties, which films have as their bases, vinyl acetal resins. It is a further object of the invention to provide a safety glass of improved characteristics.

This invention is based upon the discovery that dialkyl esters of diglycollic and thiodiglycollic acids, for example, dibutyl diglycollate and dibutyl thiodiglycollate, impart to films of resinous polymers of vinyl acetals an inordinate degree of flexibility at low temperatures. In comparison with other plasticizing substances used with these materials, the diglycollates and thiodiglycollates are remarkable in at least two respects, viz., films plasticized with them can be subjected to low temperatures without great embrittlement and the plasticizer can be incorporated in proportions varying over a wide range without the production of substantial softness or tackiness in the resulting film. Furthermore, the compositions plasticized with the substances contemplated by the invention are characterized by great transparency and toughness.

The diglycollate and thiodiglycollate esters when pure are water-white, have a low rate of hydrolysis, are compatible with vinyl acetal resins and have exceptional retentivity therewith. These substances have a desirable combination of properties which made them eminently suitable for use in plastic compositions not only for intermediate sheets or interlayers in safety glass but also for purposes where such an extremely high standard of perfection in all directions is not demanded, for example, in sheets for wrapping and decoration, in molded products, and in coating compositions. Smaller proportions of these plasticizers can be used than is usually necessary with other materials to attain the same desired flexibility and such flexibility is not accompanied by undue softness.

The diglycollate and thiodiglycollate esters especially suitable for use as plasticizers according to the invention are those resulting from esterification of the corresponding acids with aliphatic alcohols such as methyl, ethyl, propyl, isopropyl, butyl, amyl, hexyl, octyl, decyl, and lauryl and similar aliphatic alcohols, as well as polyhydroxy compounds containing one free hydroxyl group, such as monoethers of glycols, for example, the monoethyl ether of glycol, and diethers of glycerol. In place of an aliphatic alcohol group, groups such as the $OCH_2COOC_2H_5$ group or, in general, groups of the formula $OCH_2COOC_nH_{2n+1}$ may be introduced to produce compounds typified by $C_2H_5OOC-CH_2-OOC-CH_2-$
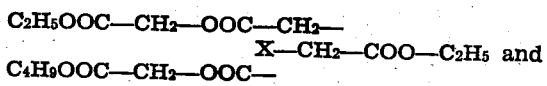
$C_4H_9OOC-CH_2-OOC-$
    $CH_2-X-CH_2-COOC_4H_9$, in which X is an oxygen or sulfur atom. These compounds are conveniently obtained from the sodium or potassium salts of the monoethyl or monobutyl esters of diglycollic or thiodiglycollic acids by further esterification by reaction with the ethyl or butyl esters of chloroacetic acid. Suitable esters may also be made by esterifying the two carboxyl groups of the acid with different alkyl groups. Since the degree of solubility of the esters in water decreases with increase of the molecular weight of the alcohol, esters of alcohols above propyl are preferred. The compounds can be prepared by methods other than esterification of the acid with the alcohol, as described in my prior applications and patents to which reference has been made herein.

The plasticizing substances are incorporated with the resins and polymers in varying amounts, ranging from small proportions up to equal parts by weight or even more, depending upon the properties desired in the final product. In general, the ratio of plasticizer to resin which is compatible and retained by the final composition varies slightly from one material to another but usually 50 parts of plasticizer to 100 parts of resin can be satisfactorily incorporated, and in many specific cases the limit of retentivity is even higher. The incorporation of the plasticizer with the resin can be effected by methods known to the art, for example, by the use of mutual solvents, or, as much preferred, by kneading with the aid of heat. Substances other than the resins and plasticizers, for example, stabilizers, dyes, pigments, fillers and other plasticizers, may be incorporated into the composition. In general, the thiodiglycollate esters are less stable to heat and light than the corresponding diglycollate esters but the thiodiglycollates can be stabilized effectively. Sheets prepared according to the invention can be used as interlayers in safety glass with or without adhesives. A preferred method of producing a sheet of safety glass consists in assembling the sheets of glass and interlayers and then pressing them to expel air between the sheets. They are then laminated under heat and pressure by means of a diaphragm press to which heat is applied. The pressing is finally completed by the hydraulic method, the resulting sheet being placed in an autoclave and exposed to a pressure of about 10 atmospheres and to a temperature from 100° to 150° C.

Specific preferred embodiments of the invention and advantages accruing therefrom are illustrated in the examples which follow.

*Example 1.*—Thirty parts of di-n-butyl diglycollate are kneaded with 100 parts of a resin sold under the trade name Formvar which is a condensation product of formaldehyde and a partially hydrolyzed vinyl ester resin.

The composition is warmed slightly to aid in the incorporation of the materials. The composition while still warm is placed between two plates in a press and formed into a film having a thickness of approximately 0.0325 inch.

The film is clear and stiff. When pulled between the fingers gently it shows no substantial elongation. There is no exudation of plasticizer from the film on standing.

*Example 2.*—Eighty parts of di-n-butyl diglycollate and 100 parts of a commercial resin sold under the trade name Vinylite-X, a polymeric vinyl acetal, is incorporated as in Example 1 and formed into films. The film resulting according to this procedure is clear and tough, has a good color and excellent flexibility. The film gives excellent elongation with immediate recovery.

*Example 3.*—Sixty parts of di-n-butyl thiodiglycollate (boiling point 190° C. at 5 mm.) are incorporated by the method of Example 1 with 100 parts of commercial resin sold under the trade name Butvar, a condensation product of butyric aldehyde with a partially hydrolyzed vinyl ester polymer. A film is made from the homogenized composition.

The resulting film is clear, tough and very flexible.

The following table illustrates typical comparative results obtained by subjecting films of 0.0325 inch thickness plasticized according to this invention and similar films plasticized with other materials to creasing or bending at a temperature of —20° F. (—29° C.). The number of bends, each bend consisting of a bend through an angle of 180° and back to the original unbent condition, which the composition withstands without cracking, are indicated. The films containing phthalates were soft whereas the diglycollate films were hard and firm, more or less like paper.

| Composition | Bends at -20° F. |
| --- | --- |
| Dimethyl phthalate 60 "Formvar" 100 | 33 |
| Diethyl phthalate 60 "Formvar" 100 | 50-74 |
| Dimethyl phthalate 75 "Formvar" 100 | 15-26 |
| Tributyl phosphate 30 dimethyl phthalate 30 "Formvar" 100 | 28-32 |
| Dibutyl diglycollate 30 "Formvar" 100 | 25 |
| Dibutyl diglycollate 60 "Formvar" 100 | 60-101 |
| Dibutyl diglycollate 80 "Vinylite-X" 100 | Over 1500 |

In impact or shattering tests at low temperatures of sheets of safety glass made with interlayers of vinyl acetal resins containing the diglycollate and thiodiglycollate esters, much improved results are obtained. In conducting such tests metal balls of various weights and sheets of the glass, either 6 inches or 12 inches square, are used. The height from which a ball of a definite standard weight can be dropped without shattering the glass which is maintained at a standard temperature is determined. A sheet made with nitrocellulose at —10° F. (—23° C.) barely withstands the impact of a 0.5-pound ball from a height of 3 feet whereas a glass made according to the invention withstands drops of the same ball from heights of 30 feet or more. A sheet of glass made with an interlayer of Butvar plasticized with di-n-butyl diglycollate withstands an impact of a 2-pound ball dropped from heights of cover 15 feet.

Inasmuch as the foregoing examples comprise preferred embodiments of the invention it is to be understood that the invention is not restricted thereto and that changes and modifications may be made without departing substantially from the invention, which is defined in the appended claims.

What I claim is:

1. A plastic composition of matter comprising a vinyl acetal resin and, as a modifying agent therefor, a neutral alkyl ester of an acid selected from the group consisting of diglycollic acid and thiodiglycollic acid.

2. A plastic composition comprising a resin resulting from the condensation of formaldehyde with a partially hydrolyzed vinyl ester polymer and, as a modifying agent therefor, a neutral alkyl ester of an acid selected from the group consisting of diglycollic acid and thiodiglycollic acid.

3. A plastic composition comprising a resin resulting from the condensation of butyric aldehyde with a partially hydrolyzed vinyl ester polymer and, as a modifying agent therefor, a neutral alkyl ester of an acid selected from the group consisting of diglycollic acid and thiodiglycollic acid.

4. A plastic composition as defined in claim 1 and further characterized in that the modifying agent is a neutral alkyl ester of diglycollic acid.

5. A plastic composition as defined in claim 1 and further characterised in that the modifying agent is a neutral alkyl ester of thiodiglycollic acid.

6. A plastic composition as defined in claim 1 and further characterized in that the modifying agent is di-n-butyl diglycollate.

7. A plastic composition as defined in claim 1 and further characterized in that the modifying agent is di-n-butyl thiodiglycollate.

8. A plastic composition as defined in claim 1 and further characterized in that the modifying agent is dihexyl thiodiglycollate.

9. A plastic composition of matter embodying a resin resulting from the condensation of formaldehyde with a partially hydrolyzed vinyl ester polymer and, as a modifying agent therefor, di-n-butyl diglycollate.

10. A plastic composition of matter embodying a resin resulting from the condensation of butyric aldehyde with a partially hydrolyzed vinyl ester polymer and, as a modifying agent therefor, dibutyl thiodiglycollate.

11. A plastic composition of matter embodying a resin resulting from the condensation of butyric aldehyde with a partially hydrolyzed vinyl ester polymer and, as a modifying agent therefor, di-n-butyl thiodiglycollate.

12. A plastic composition of matter embodying a resin resulting from the condensation of butyric aldehyde with a partially hydrolyzed vinyl ester polymer and, as a modifying agent therefor, di-n-hexyl thiodiglycollate.

13. Safety glass including in combination a plurality of sheets of glass bonded together through the medium of a layer of plastic composition comprising a vinyl acetal resin and, as a modifying agent therefor, a neutral alkyl ester of an acid selected from the group consisting of diglycollic acid and thiodiglycollic acid.

14. Safety glass including in combination a plurality of sheets of glass bonded together through the medium of a layer of plastic composition comprising a resin resulting from the condensation of formaldehyde with a partially hydrolyzed vinyl ester polymer and, as a modifying agent therefor, a neutral alkyl ester of an acid selected from the group consisting of diglycollic acid and thiodiglycollic acid.

15. Safety glass including in combination a plurality of sheets of glass bonded together through the medium of a layer of plastic composition comprising a resin resulting from the condensation of butyric aldehyde with a partially hydrolyzed vinyl ester polymer and, as a modifying agent therefor, a neutral alkyl ester of an acid selected from the group consisting of diglycollic acid and thiodiglycollic acid.

16. Safety glass including in combination a plurality of sheets of glass bonded together through the medium of a layer of plastic composition comprising a vinyl acetal resin and, as a modifying agent therefor, a neutral alkyl ester of diglycollic acid.

17. Safety glass including in combination a plurality of sheets of glass bonded together through the medium of a layer of plastic composition comprising a vinyl acetal resin and, as a modifying agent therefor, a neutral alkyl ester of thiodiglycollic acid.

18. Safety glass including in combination a plurality of sheets of glass bonded together through the medium of a layer of plastic composition comprising a vinyl acetal resin and, as a modifying agent therefor, di-n-butyl diglycollate.

19. Safety glass including in combination a plurality of sheets of glass bonded together through the medium of a layer of plastic composition comprising a vinyl acetal resin and, as a modifying agent therefor, di-n-butyl thiodiglycollate.

20. Safety glass including in combination a plurality of sheets of glass bonded together through the medium of a layer of plastic composition comprising a vinyl acetal resin and, as a modifying agent therefor, dihexyl thiodiglycollate.

21. Safety glass including in combination a plurality of sheets of glass bonded together through the medium of a layer of plastic composition defined in claim 9.

22. Safety glass including in combination a plurality of sheets of glass bonded together through the medium of a layer of plastic composition defined in claim 11.

23. Safety glass including in combination a plurality of sheets of glass bonded together through the medium of a layer of plastic composition defined in claim 12.

LUCAS P. KYRIDES.